(12) United States Patent
Kulas

(10) Patent No.: US 6,947,044 B1
(45) Date of Patent: Sep. 20, 2005

(54) CREATION AND PLAYBACK OF COMPUTER-GENERATED PRODUCTIONS USING SCRIPT-CONTROLLED RENDERING ENGINES

(76) Inventor: Charles J. Kulas, 244 Texas St., San Francisco, CA (US) 94107

( * ) Notice: Subject to any disclaimer, the term of this patent is extended or adjusted under 35 U.S.C. 154(b) by 0 days.

(21) Appl. No.: 09/576,704

(22) Filed: May 22, 2000

Related U.S. Application Data
(60) Provisional application No. 60/135,207, filed on May 21, 1999.

(51) Int. Cl.$^7$ .............................................. G06T 15/70
(52) U.S. Cl. ......................... 345/473; 345/427; 463/32; 348/552
(58) Field of Search ............................... 345/473, 427; 463/32; 348/552

(56) References Cited

U.S. PATENT DOCUMENTS

| | | | | |
|---|---|---|---|---|
| 5,977,967 | A | * 11/1999 | Berner et al. | ............... 345/826 |
| 6,097,441 | A | * 8/2000 | Allport | ....................... 348/552 |
| 6,671,690 | B2 | * 12/2003 | Webber et al. | .............. 707/100 |
| 6,707,489 | B1 | * 3/2004 | Maeng et al. | .......... 348/211.12 |

OTHER PUBLICATIONS

Reynolds, Craig W., "Computer Animation with Scripts and Actors," Association for Computing Machinery, 0–89791–076–1/82/007/0289, 1982, 13 pages. Citation of original paper: Reynolds, C.W. (1982) "Computer Animation with Scripts and Actors," in Computer Graphics, 16(3) (SIGGRAPH 82 Conference Proceedings) pp. 289–296.

Jane Weaver, "Net Ads That Look Just Like TV," Internet article at www.ZDNet.com, Feb. 17, 1998, 5 pages.

"Director 7 Shockwave Internet Studio Frequently Asked Questions," internet article on www.macromedia.com, Feb. 16, 1999, 6 pages.

John Clark, "The Power of Objectvideo," internet article at www.objectvideo.com, Jun. 4, 2001. 6 pages.

"Image and Video Compression Techniques," Internet article at www. autosophy.com. Jun. 4, 2001, 19 pages.

Craig Reynolds, "Computer Animation with Scripts and Actors," internet article at www.red3d.com, Aug. 26, 2000, 16 pages.

* cited by examiner

*Primary Examiner*—Kimbinh T. Nguyen

(57) ABSTRACT

A system for controlling a rendering engine by using specialized commands. The commands are used to generate a production, such as a television show, at an end-user's computer that executes the rendering engine. In one embodiment, the commands are sent over a network, such as the Internet, to achieve broadcasts of video programs at very high compression and efficiency. Commands for setting and moving camera viewpoints, animating characters, and defining or controlling scenes and sounds are described. At a fine level of control math models and coordinate systems can be used make specifications. At a coarse level of control the command language approaches the text format traditionally used in television or movie scripts. Simple names for objects within a scene are used to identify items, directions and paths. Commands are further simplified by having the rendering engine use defaults when specifications are left out. For example, when a camera direction is not specified, the system assumes that the viewpoint is to be the current action area. The system provides a hierarchy of detail levels. Movement commands can be defaulted or specified. Synchronized speech can be specified as digital audio or as text which is used to synthesize the speech.

14 Claims, 9 Drawing Sheets

CREATION AND PLAYBACK OF COMPUTER-GENERATED PRODUCTIONS USING SCRIPT-CONTROLLED RENDERING ENGINES

CLAIM OF PRIORITY

This application claims priority from co-pending U.S. Provisional Patent Application Ser. No. 60/135,207 filed on May 21, 1999, entitled "CREATION AND PLAYBACK OF COMPUTER-GENERATED PRODUCTIONS USING RENDERING ENGINES" which is hereby incorporated by reference as if set forth in full in this application.

BACKGROUND OF THE INVENTION

This invention relates in general to communication of information by computers and more specifically to controlling a rendering engine with commands to play back a production on a computer system.

A major use of modern computer systems is in the presentation of productions including image and sound. Productions can include animations, scene rendering, simulations, digitized video, three-dimensional sound, or other audio and visual effects. A problem with such applications is that the amount of data that needs to be transferred and displayed is enormous, often exceeding the limits of the commonly available computing power, data channels, or other resources.

For example, it has long been a promise of the Internet to act as a broadcast network so that real-time streaming audio/video information can approach the resolution and frame rate of television. However, the vast amount of information in the form of digital data that must be conveyed from a content source to many thousands, or millions, of end user computers at a high rate has proven to be more than the Internet can handle.

Efforts to try to solve the problems of Internet delivery of productions tend to fall into two categories. The first is minimizing the amount of data that needs to be transferred by using data compression on the raw, original audio and video information. The second approach is to improve the ability of the Internet to deliver large amounts of data.

Many data compression standards can be found on the Internet today, such as the standards promulgated by the Moving Picture Experts Group (MPEG). Other standards include Microsoft Corporation's Audio Video Interleave (AVI) or Apple Computer Corporation's Quicktime. Even though these standards can achieve compression ratio's of about 20–50 to 1, this is still not sufficient to allow so-called "full-screen, full-motion" video to be delivered reliably over the Internet. Because of this, the attempts at "video" broadcasts over the Internet have used very small windows of low-resolution and low frame rate (perhaps 15 frames per second (fps)) broadcasts.

As far as improving the ability of the Internet to deliver large amounts of data; efforts such as multi-casting (e.g., the M-Bone architecture) have resulted in limited success in relatively localized portions of the Internet. Such approaches have failed to improve the Internet's bandwidth to the point where Internet broadcasts can realistically compete with television broadcasts in terms of high-quality audio and video presentations.

An alternative to real-time streaming of a production is to download the production in non-real-time. That is, the production is downloaded as a large file which can be played back at a later time. Since the production, once downloaded, resides on a user's local hard disk in the user's computer system, the throughput of data is much higher and much more reliable than over a network such as the Internet. Alternatively, the production can be obtained in compact disk—read only memory (CDROM), or Digital Versatile Disk (DVD) formats with similar benefits. A problem with the downloading approach is that the download is slow. A production on the order of minutes at a reasonably high resolution amounts to tens of megabytes in size and requires hours of download time over a typical modem connection to the Internet. Even where there is a fast Internet connection, the production may require dozens of megabytes of storage on the user's hard disk. Even as download rates increase, the resolution, frame rate and frame size of productions is increasing, as is the number of Internet users. Thus, the Internet's ability to deliver video content continues to lag far behind the public's desire to access the video content over the Internet.

Another problem with making the entire production available in stored frames at the user's computer is that the content provider does not control the time of viewing and can not restrict availability of the contents. The provider must also deal with distribution of CDROMs, DVDs, etc., or with hosting the production for download over expensive servers, storage arrays and high-bandwidth channels at relatively high cost. It is an added inconvenience to the user to obtain the media by purchasing it at a point-of-sale retailer, mail order, etc.

Other technology areas that implicate technology for displaying visual and audio information over a network include web languages such as "Lingo" by Macromedia and "Java" as defined by Sun Microsystems. These languages allow a programmer to define and animate objects and sounds on an end-user's computer. Typically, these languages are complex and mathematical and are directed to two dimensional animation or layout. This is primarily because they are intended to be used in a web page where a "book" analogy, rather than a television analogy, is followed.

The productions produced by web languages require that the user executes a web browser at a computer. The program that defines the production must be loaded completely into the computer. Once loaded, the program executes to create a short display, animation or image or sound effect. Primitive games have also been developed using this technology. The approach of web languages is not suited to generating a broadcast quality, television-like production over the Internet because it is complex to define even a few seconds of production, is not oriented toward rendering real-world environments, requires complete downloading of the program before executing and does not render realistic, or full-featured, three dimensional scenes.

A final technology area is network-oriented three dimensional games. These use a high performance rendering engine executing on a user's computer. If the user is playing in a multiplayer mode, information as to other player's positions and actions is transmitted to each player's computer so that a character that emulates the other players' actions appears-in the game. Each emulated player performs actions under player direction to run, jump, shoot, etc.

The rendering engines in such games are very sophisticated with high resolution and color, and can achieve frame rates at, or above, television frame rates. However, this approach does not achieve a broadcast television production goal since the point of view is completely controlled by a player. That is, the player is able to move about in an interactive environment. The position and view are completely under the control of the player. Each player's movement is under control of each respective player. Thus, there is no possibility for storytelling as in a traditional television or movie production. Rather, these games focus solely on allowing the player to have complete control in a predefined, relatively static, environment.

Attempts have been made to make "movies" that run on the rendering engines. An early popular rendering engine is the "Quake" engine produced by Id Software to allow players to hunt-and-kill other opponents in a multiplayer first-person shooter type of game. So-called "Quake movies" are created by turning on a data capture mode of the Quake engine and moving a character's point of view. The character acts as the "camera" since wherever the character looks determines the part of the scene that is recorded. Any characters that appear onscreen must be controlled by human operators in real time while the data is being captured. The requirement of coordinated human control of characters in real time makes creating dramatic and diverse productions extremely difficult in a Quake movie. Early attempts at short Quake movies such as "Blahbalicious," and "Operation Bayshield" are amusing but limited parodies on the original world of the Quake game. The productions must be downloaded completely and then played back by the Quake engine to re-create the production. Deviations from the models and structures in the Quake world were difficult to achieve and required designing entirely new models with computer-aided drafting, modeling and painting programs.

As discussed above, producing a computer production with any of the prior approaches is complex. This is because the use of computer tools, engines, or other utilities and applications, requires modeling, rendering, animation, painting, and other complex and specialized software. Typically, these applications are mathematical in nature and are very time-consuming to learn and use. Also, many productions require special tools to produce a computer production. For example, motion capture, software effects, defining camera movement, building virtual models, performing audio recording, digitizing and synchronization, all require knowledge of specialized procedures and specific software or hardware. Such productions also do not lend themselves to multicast or streaming broadcasts of the productions over the Internet because of the large amount of data required to be transferred.

Thus, it is desirable to provide a system that allows effective delivery of high-quality broadcast productions over a computer network, such as the Internet. Such a system should provide delivery with a minimum amount of bandwidth required in the transmission medium, and a minimum of resources in the reception and storing of the production. It is also desirable to reduce the complexity, skill level and time requirements of producing such productions, especially from a storyteller's point of view.

SUMMARY OF THE INVENTION

Figure 1A:
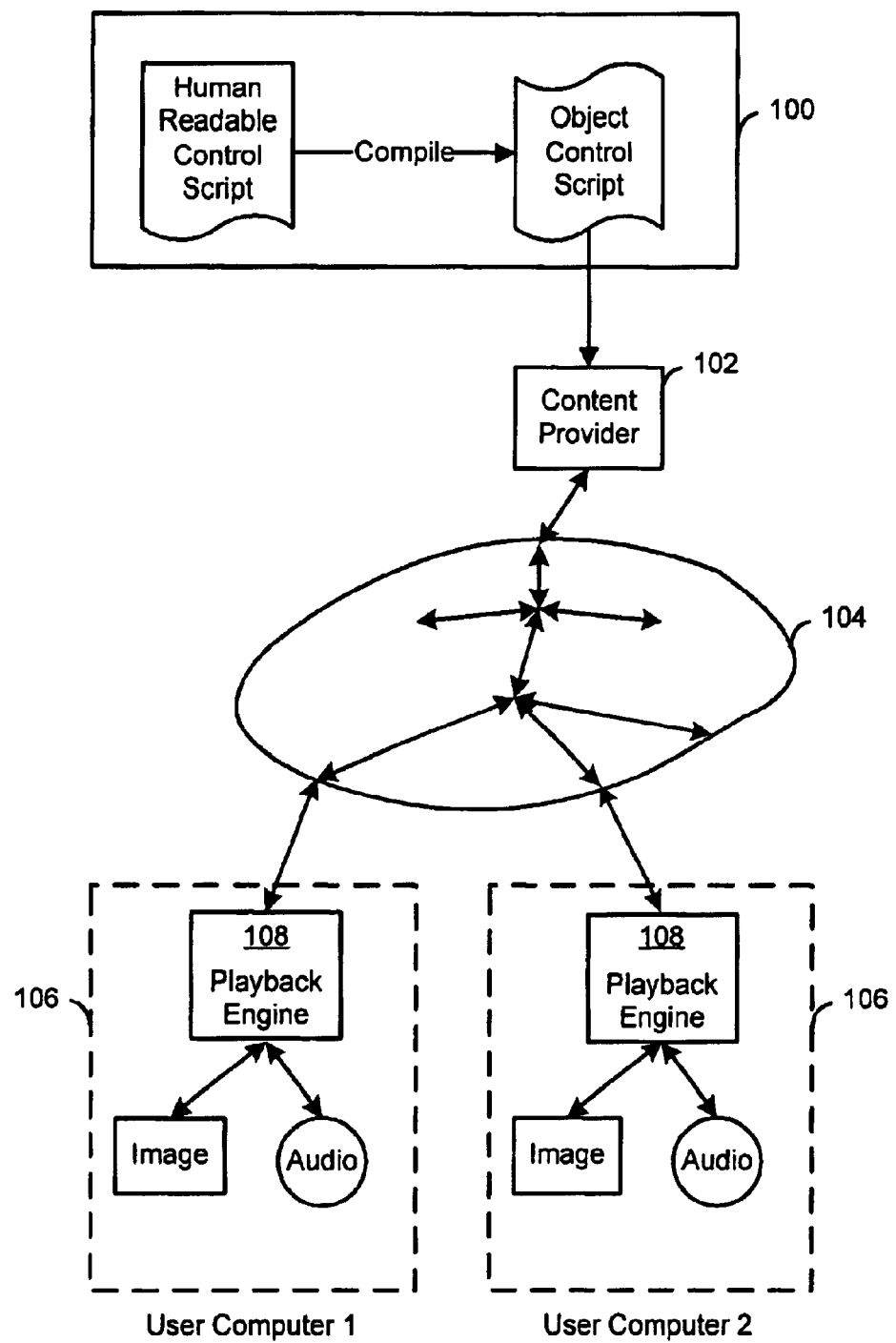
FIG. 1A shows an overview of the system of the present invention.

The present invention is a system that allows a rendering engine at an end-user's computer to be controlled with commands. The commands can originate at the user's computer or at another source as, for example, over a network. Many commands are possible such as commands for setting and moving camera viewpoints, animating characters, and defining or controlling scenes, sounds and other items.

The command language is multi-level. At a fine level of control math models and coordinate systems can be used make specifications. At a coarse level of control the command language is very simple to use and understand and approaches the text format traditionally used in television or movie scripts. This is achieved, in part, by using simple object names within a scene to be rendered to identify items, directions and paths. Commands are further simplified by having the rendering engine use defaults when specifications are left out. For example, when a camera direction is not specified, the system assumes that the viewpoint is to be the current action area. An action area is automatically identified by the system and can be a properly framed two-shot when there is a dialogue in progress, a movement of a key character, an establishing shot when there is a scene change, etc.

The system provides a hierarchy of detail levels. When a very high level of detail is desired (e.g., a close-up of a person's lips speaking) a "canned" series of frames can be specified. For medium or long shots when the person is not talking a simple texture map of the lips and face can be used. Movement can be defaulted or specified. A default movement allows a default skeletal model animation to move a character from one point to another. A more detailed movement specification allows the human writer/scripter to specify keyframe animation, foot positions for walking, etc.

The present invention emulates television broadcasts over a computer network by allowing story presentations, or productions, to be re-created at end-user computers merely by transmitting the control stream to the computer.

Audio speech can be synchronized to frames being rendered, such as images showing moving lips, by a sound analysis routine that interprets the sounds represented by digital audio waveforms and performs the appropriate lip animations. Alternatively, speech can be represented by text either as written language or phonetics. The text representation is used to synthesize speech. Audio music can use default MIDI or waveform music. Parameters of the default music can be modified to change, or transform, the default music in tempo, volume, style, etc.

In one embodiment, the invention discloses a method for providing commands to control a rendering engine to produce a visual display in a computer system. The computer system includes a processor-coupled to a display device. The processor executes instructions to animate an object within a simulated scene for display. The computer system is coupled to a network. The method comprises the steps of (1) using the processor to receive a command from the network to animate an object in the scene; and (2) using the processor to compute a default camera view wherein the animated object is included in the default camera view.

DETAILED DESCRIPTION OF A PREFERRED EMBODIMENT

FIG. 1A shows an overview of the system of the present invention. In FIG. 1A, a writer, or scripter, creates a control script at a computer such as computer 100. The control stream file is stored at server 102. Server 102 "streams" the control data over network 104 to end-user, or viewer, computers 106. Each viewer computer includes a rendering engine, or playback engine, 108 to translate the control commands into a media production.

The playback engine is a software graphics and audio processing program that includes routines to model and render objects, to animate objects, replay sound and perform processing for audio and visual animation an effects. In general, this type of engine can be obtained by modifying a three-dimensional computer game program's engine to allow the engine to be controlled by a control stream of the present invention. Such a design can include a "command interpreter" to handle the conversion of control stream commands into control of the rendering engine. Such an approach is shown in FIG. 1B.

Figure 1B:
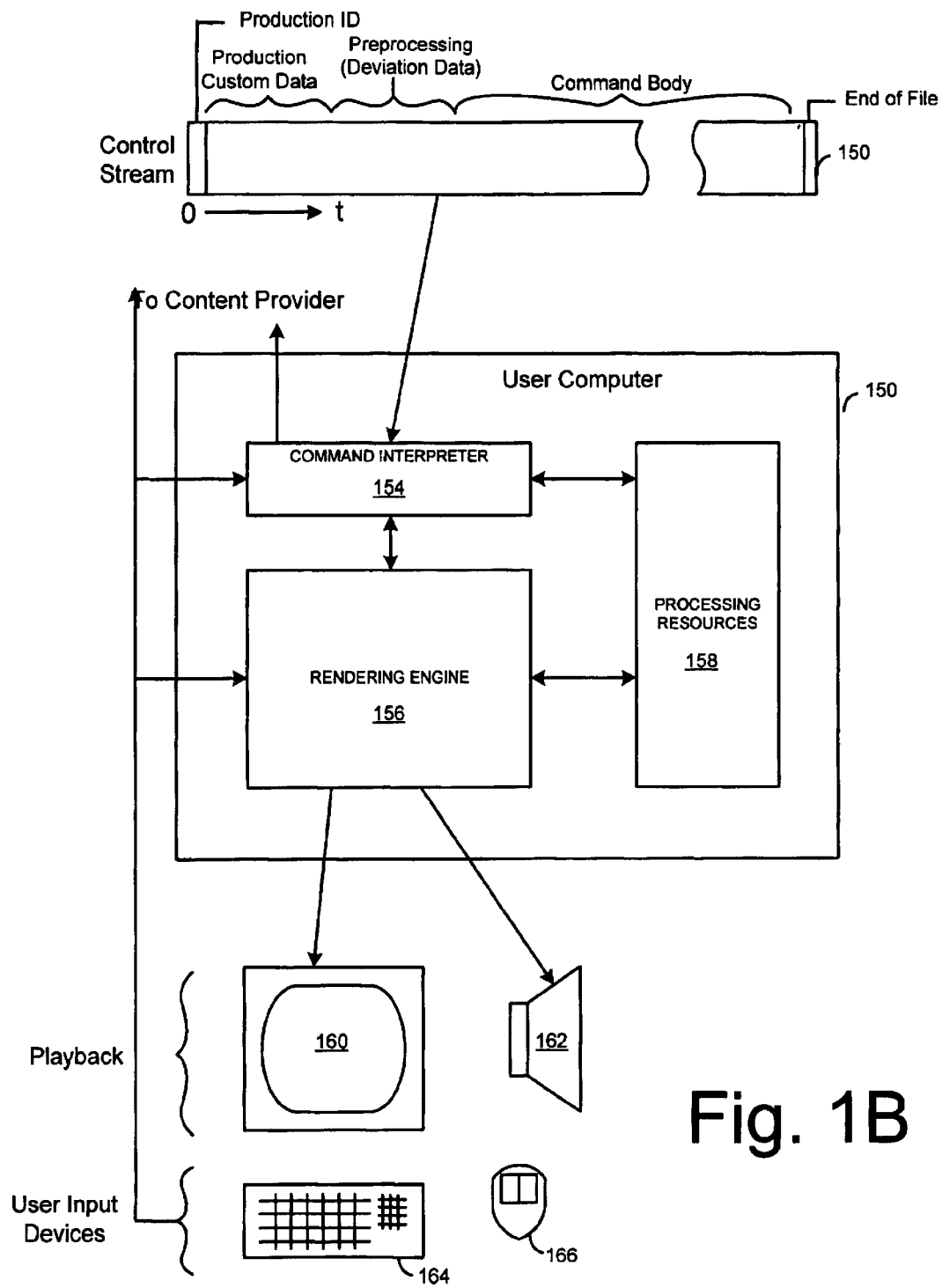
FIG. 1B illustrates an embodiment of the invention where commands are interpreted by a command interpreter residing on a user computer.

In FIG. 1B, control stream 150 includes various data including a production identifier, production custom data, preprocessing information to derive data from default models, a command body representing the majority of actual control of the rendering engine to achieve a production playback, and an end of file indicator. Although FIG. 1B shows the control stream linearly, many different arrangements for transferring the control information necessary to achieve playback of a production are possible. The arrangement can deviate from that shown in FIG. 1B. Information can be repeated. Information can be interspersed with other information. Also, as discussed below, the information need not be streamed at all as all, or part, of the information can be loaded into the user's computer (or another device) prior to playback. These locally resident parts of the control information can be later augmented by the control stream information. Thus, large amounts of audio information, for example, needed by a particular production can be sent to the user on a CDROM, DVD, hard disk, downloaded from a network, etc., so that the data is already present at the user's computer prior to receiving the control stream. For ease of discussion, the present invention is most often described where the control information is delivered as a stream of data over time via a network such as the internet.

The control stream is received by command interpreter 154. Command interpreter 154 acts to interpret the symbolic control commands into control signals for rendering engine 156. Although the terms "interpret" or "compile" are used in this specification, the use of commands, code, symbols or other data to cause a function to be performed can be by any means as is known in the art. For example, the command interpreter need not strictly interpret the commands. All or part of the commands can be "compiled" at the user computer prior to controlling the rendering engine. Rendering engine 156 can be a rendering engine as is known in the art, and adapted for use with the present invention by making the rendering engine compatible with the control commands described herein.

Both command interpreter 154 and rendering engine 156 use resources such as processor time, memory, etc., on user computer 152. These resources are used, for example, to store the data needed for the production, to derive additional data, and for other purposes. Rendering engine 156 is used to generate images on display device 160 and to generate audio on speaker 162. User input devices such as keyboard 164 and mouse 166 are used to receive signals from the user which can be transferred to any of rendering engine 156, command interpreter 154, or can be sent to an outside device such as to the content provider server 102 of FIG. 1A.

Figure 2A:
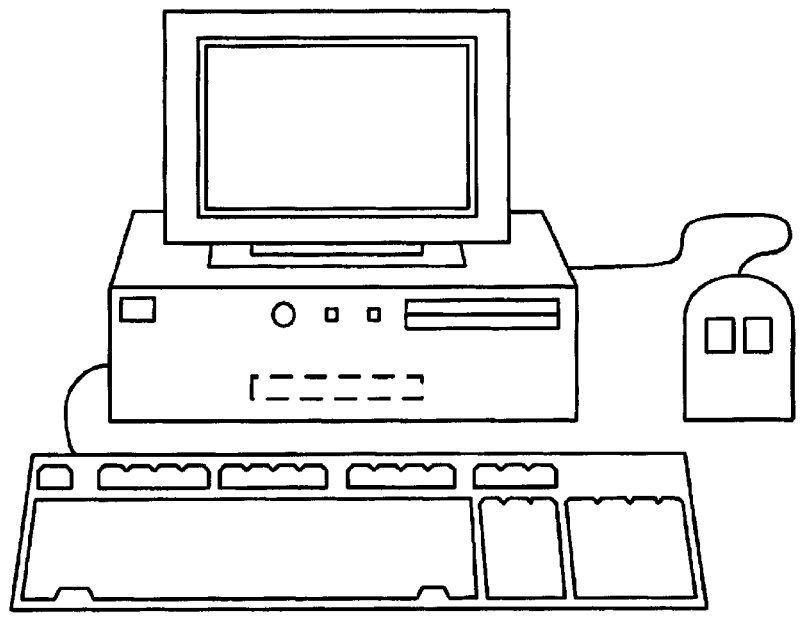
FIG. 2A illustrates a typical personal computer suitable for use with the present invention.
Figure 2B:
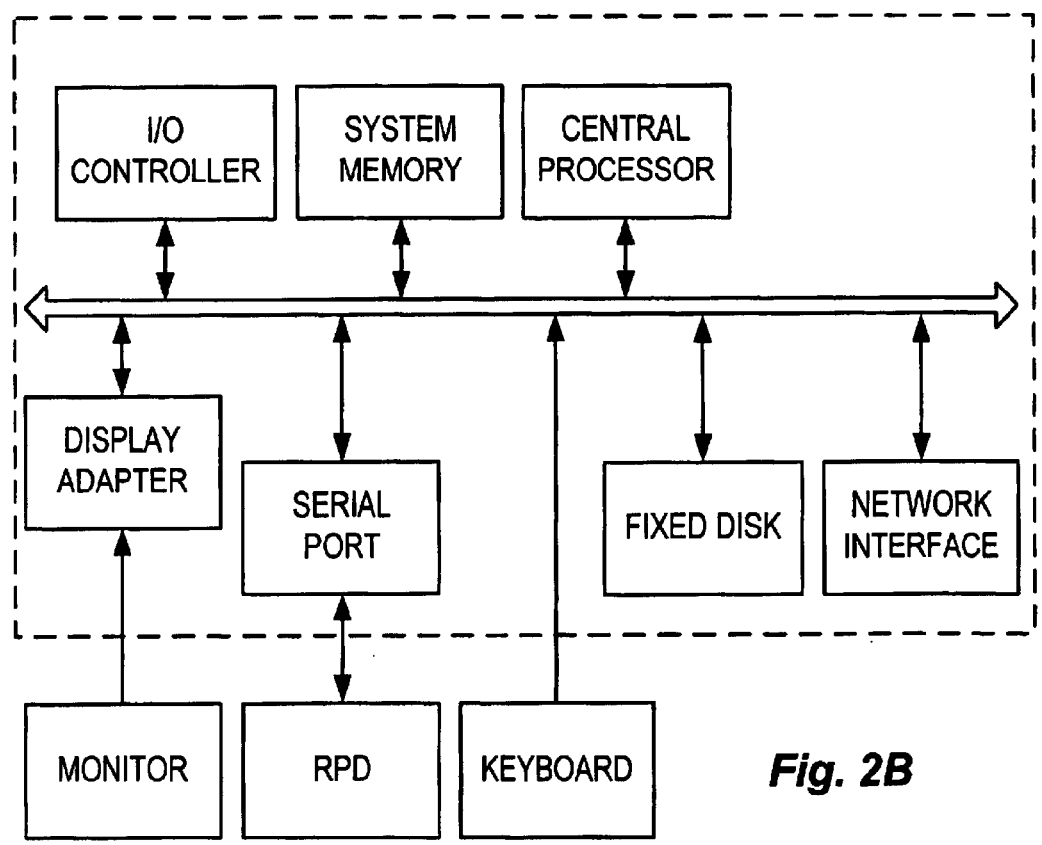
FIG. 2B illustrates subsystems in the computer of FIG. 2A.

FIGS. 2A and 2B illustrate a typical personal computer and its subsystems, respectively, suitable for use with the present invention.

Figure 1C:
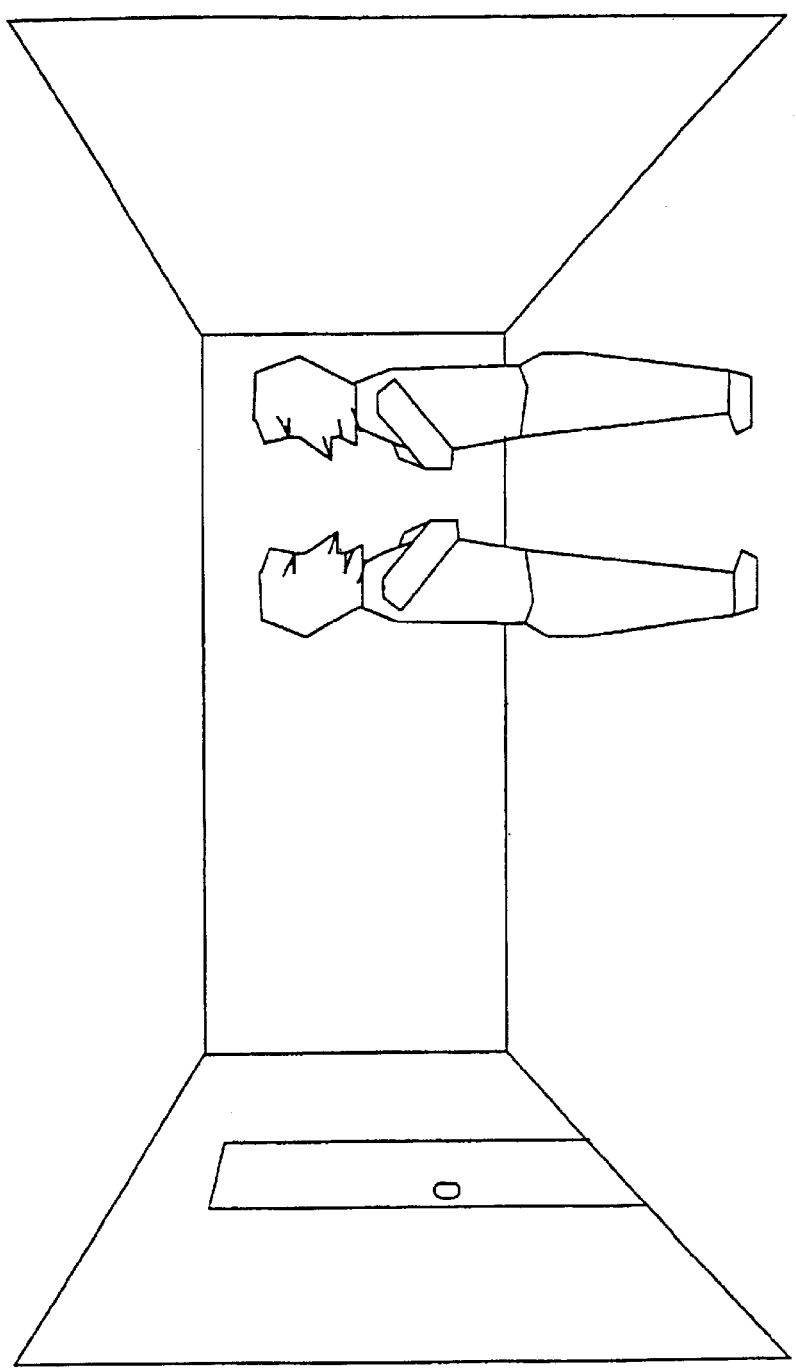
FIG. 1C illustrates objects in a scene.

The control stream specifies actions at different levels. To illustrate these levels, assume that a computer production is designed so that there are two characters, Character1 and Character B, in a room with a door, such as is shown in FIG. 1C. The scene requires Character1 to exit through the door. In a prior art approach, the scene is modeled, illuminated, texture mapped and animated at a time well before transmitting the actual production. The scene is rendered by a high-powered computer or computers in non-real time and the rendering of each frame of the scene is recorded. Then the recorded frames are sequenced and compressed, e.g., in an MPEG format, and the compressed stream is transmitted to the user's computer where it is decoded and played back one scene at a time according to the MPEG stream.

In contrast, the present invention allows commands that describe various actions affecting the scene to be sent from the content provider to the user's computer, or other viewing apparatus. This completely eliminates the need for a frame-by-frame transmission from the content provider to the end user, or viewer. For example, camera and light source placement and movement can be specified by the control stream. Character placement, movement and animation can be specified by the control stream and carried out by the playback engine. Scene transitions, text displays and sounds are also specified by the control stream.

Where the control stream specifies, for example, a camera movement, the playback engine performs the camera movement and renders the scene accordingly. An example is where the camera pans left-to-right at an angular velocity of 0.5 radians/sec. The control stream instruction for such a movement is "CAMERA PAN LtoR 0.5 r/s." The pan may occupy several seconds of playback time which corresponds to hundreds of frames at high resolution. The data needed to convey the control stream instruction to pan the camera and generate the frames may be only a few bytes of information. Thus, millions of bytes of image display information are generated by just a few bytes transferred over a network such as the Internet.

At a very high level of control, the control stream includes instructions that specify more sophisticated actions such as "Character1 exits through the door." This causes the playback engine to animate Character1 to walk to the door, open the door, and exit through the door. The playback engine includes any other visual and audio effects such as the sound of footsteps toward the door, the shadows changing on the Character1 as the character passes beneath a light, other characters in the room watching as Character1 departs, etc. Every basic action that can be specified by a scripter and used to control the rendering engine includes a large amount of "defaults". The defaults are used extensively when the level of control being specified is "coarse." A coarse level of control gives only a general instruction about objects such as characters, furniture, or other items. An example of a coarse level of control is the command "Character1 EXITS Room".

The control stream of the present invention allows different levels of control. A next-lower level of control can specify the speed with which Character1 exits the room, whether Character1 skips, crawls, etc. A next-lower level is to specify each footstep that Character1 takes in order to exit through the door. A next-lower level is the mathematical modeling placement and animation of Character1's feet, legs, torso, arms, translational position, etc. A next-lower level would deal-with the position of polygons making up Character1's mathematical model. Another option is to insert frames or partial frames of a pre-rendered scene showing Character1 walking and exiting through the door. These pre-rendered segments can be used in place of, or in cooperation with, the higher-level control stream commands. For example, a pre-rendered animation of Character1's hair moving in the wind as she walks can be transferred through the control stream and overlaid on top of the playback engine's generated images. Or, the full audio sound of Character1's footsteps can be provided in the control stream and stored on the computer's disk. As the playback engine animates Character1, it keeps playback of the downloaded audio in synch with the visual imagery.

FIGS. 2A and 2B illustrate a computer system and subsystems, respectively, suitable for use as end-user computers running a rendering engine under the control of script commands according to the present invention. As used in this specification, the terms "commands," or "script commands," can include any text command, token, number, symbol or other form of digital or analog communication used to send information to a computer system executing a rendering, or "playback," engine to facilitate the rendering engines display of images or sound. Thus, the specific commands presented in this application are only a subset of the possible commands within the scope of the present invention. A "control stream" refers simply to two or more such commands to be executed in a predetermined sequence, or order.

The control script of the present invention is a large and comprehensive language similar to a programming language. The control script allows a scripter to specify scenes, objects within scenes such as rooms and furniture, characters, objects that characters can manipulate, Character1 and object appearance and movements; audio in the form of music, speech and sound effects; camera positioning, movement and characteristics, lighting, physics and other aspects of delivering and playing back the production. The extensive use of defaults allows a scripter to specify actions at a very high level and makes the amount of data that needs to be transferred to a user's (i.e., a viewer's) computer extremely small. The provision of different levels of control allows a scripter to obtain added control over the production when desired. Places and actions can be described with respect to objects, parts, characters or other items in the scene. This greatly simplifies the scripting of the production and makes writing the control script very intuitive.

The complete system of the present invention involves many concepts including scripting and modeling of a production to storage and delivery of the control script information and playback of the production on a user's computer. To illustrate these concepts a few exemplary aspects of the control script are explored in depth. These examples include (1) camera control, (2) character control, (3) audio and (4) synchronization.

I. Camera Control

The control stream provides several levels of control over each aspect in the production. The control resolution ranges from coarse to fine. The coarse levels are the more "automated" levels of control where a human "scripter" who defines the production, is given less control but is provided with broader commands that allow more action to be specified with relative ease. The coarse levels of control are "plain-text" specifications that are easy to understand, even for someone completely unfamiliar with the semantics of the control script of the present invention. Finer levels of control give more detailed and precise control but require more intensive specifying by the scripter. The finer levels of control become less plain-text and more mathematical.

Levels of control for aspects in the production are linked to the levels of specificity of position, movement and characteristics.

The production takes place with respect to a "world" that has objects, sound and movement. The term "item" refers to any thing in the world as, for example, a building, character, camera, light beam, raindrop, sound, etc. Items which are intended to represent visible things in the world are called "objects." Examples of items which are not objects are a camera, sound, wind effect, etc. Objects are made up of parts. Parts are a collection of polygons. Each polygon is a set of three of more points. Other embodiments are possible that use differing numbers or types of components for item definitions. For example, another embodiment of the invention may only define a two-dimensional production where objects can be bitmaps or vector drawings.

A "fine" level of position specificity is a math model where a position is expressed in a coordinate system for the production's world. A common coordinate system is the x, y, z system where an object's position is specified by a relative displacement from an "origin" point in the world. Other coordinate systems can be used. Relative positioning with respect to another item, object, part, polygon, point, etc. in the world. Note that a math model position absolutely determines a point in space in the world.

A coarser level of position specificity identifies a polygon, part, object or item as the desired position. Since these constructs, unlike a point construct, occupy "space" in the world, these coarser levels of positioning do not always uniquely determine where the object being positioned resides. For example, a command in the control stream language of the present invention allows a scripter to specify "CAMERA AT top of tree." In the preferred embodiment, assuming there is an object near the action area that has been labeled "tree," an algorithm is used to determine a point near the top of the tree. This is done without too much difficulty by locating a furthest point in the tree object from the ground. However, if there is a bird object perched on top of the tree, or if the tree is swaying in the wind, the preferred embodiment locates a point near the top of the tree that is unoccupied (e.g., beside the bird), or a point that represents an average, stationary top of the tree (in the case of swaying). Although examples of routines to take care of positioning, movement and characteristic specifications are given, many different approaches may be taken with equally effective results. In coarse levels of control where the playback engine attempts to automate the scripter's work, the preferred embodiment strives to produce a result that is intuitive to the scripter and makes sense within the world. Even more importantly, the result should be consistent among different playback engines, as is discussed in more detail, below.

A very coarse level of camera control does not even require that a position be specified for the camera. In this case, the playback engine picks a camera position, angle of view, direction of pointing, etc., as appropriate. For example, throughout most of a production the attention is fixed on an "action area." The action area changes frequently but it is usually where speaking or object movement are taking place. Such an area is either specified in the control script (e.g., ACTION AREA={name of one or more characters or places}) or is intelligently assumed by the playback engine. For example, if there are two characters in a room then the action area is, by default, an area that includes both characters. If the control script has just described a car speeding off, then the action area is the car as it moves down the road.

By either directly specifying an action area, or relying on the default action area, the scripter can easily specify a scene's point of view by requesting a CAMERA Long, CAMERA Close-Up, etc. By allowing positioning and movement commands to reference objects in the scene, the scripter is free of the typical and cumbersome math language specifications. Other approaches for inputting object and camera movement and animation include intricate path specifications using a mouse, keyboard, motion capture or other devices. The control script of the present invention allows the scripter to make statements such as "CAMERA VIEW Character1," "CAMERA Slow Pan to Character2," "CAMERA 2-Shot Character1, Character2;" and "CAMERA AT Behind Character2 VIEW Character1."

Other camera commands are possible. The camera can be made to "track" an object, such as a walking character, by specifying a point "behind" or otherwise relative to the character that stays with the character.

Multiple cameras can be defined. Once defined, each camera can stay at its position, or move, and be invoked with a "TAKE" command. For example, the command sequence below defines two cameras, CAMERA1 and CAMERA2, at different positions:

SCENE Living_Room
CAMERA Camera1 AT Doorway VIEW Room Center
CAMERA Camera2 AT Room Center The scene is set to use a pre-defined model named "Homer's_Living_Room" which has parts such as a "Doorway" and a "Room Center". The cameras are positioned with respect to the parts. They can also be positioned in any of the ways discussed above such as by absolute coordinates, using default "action areas," etc. Once positioned, each camera can be made the active camera with a "TAKE" command such as "TAKE Camera1" or "TAKE Camera2".

A preferred embodiment of the invention allows scene models to be created in several off-the-shelf third-party applications such as 3dStudio Max by Autodesk. Names are associated with parts in the model either in the application or in a separate application designed specifically to handle name assignments. Cameras can also be defined with the aid of the modeling applications by using a pre-designated symbol or name to define the camera position. Such positions, along with the model and parts, are imported into a control stream compiler, described below, to generate the control stream.

Table I, below, shows an example of the definition for basic camera commands in the control script language. Although only camera commands are presented in detailed syntax, this is indicative of the approach of the invention to provide a multi-tiered command language where inclusion or omission of command parameters is permissible and results in intuitive actions on the part of the rendering engine. In general, a command interface acts to interpret commands that adhere to the syntax and to, in turn, control the rendering engine according to the command specifications. A routine called a Control Script Command Interface (CSCI) performs the command interpretation. By adhering to the syntax specification for a standard set or subset of control script commands, a standard interface is achieved whereby any number of different rendering engines by different manufacturers can be operated with the same control script.

TABLE I

| Syntax | Description |
| --- | --- |
| CAMERA {"camera_name"} {shot} {AT position} {VIEW subj1, subj2, . . .} {PROPERTIES camera properties}; Where "shot" is one of: Extreme Long, Long, Wide, Medium, Frame, 2-Shot, Close-Up, Extreme CU. position can be an object name preceded by "above," "below," "next to," "inside". Default is the action area. Can use x,y,z for coordinate position. camera properties include: Focal Length, Aperture, Aspect Ratio. subj can be a coordinate location by specifying x,y,z numbers. | Stationary camera command. Can accept one or more subject specifications such as "Character1". If no subject is specified then the "action area" is used as the default subject. The distance to the subject(s) is defaulted to a medium shot. "camera_name" is typically specified by the scripter. |
| CAMERA TRACK {shot} {subject} | Panning Camera command. Camera stays stationary but changes pointing direction to track a subject. Can use shot definitions as, above. |
| CAMERA PAN {direction} {speed} | Camera Pan command. |
| CAMERA ZOOM {start} {speed} {end or duration} Where start specifies a starting focal length. speed is rate of change of focal length. end or duration is ending focal length or amount of time to zoom at specified rate. | Camera zoom command. |
| CAMERA FOLLOW {shot} {subject} {distance} | Dolly Camera command. Camera stays follows subject's motion at distance away. |

In Table I, syntax and keywords are identified for use with different camera commands. The command with the most variations is the "CAMERA AT" command which is used to specify a camera position and optional viewing direction.

As shown in Table I, the "CAMERA AT" command uses a "camera_name". This is typically any name chosen by the scripter. For example, the camera can be called "Camera1," "Main_Camera," "Bird's_Eye_Can," etc. Although not shown in the remainder of the commands in Table I, each command can accept a camera name to identify which camera is being controlled. A camera can become the active camera by use of the "TAKE" command as described above, or by simply naming the camera in the track, pan, zoom or follow commands (but not the "CAMERA AT" command). If no name is specified with a command then the currently active (i.e., last named) camera is assumed to be the camera on which the command acts.

The "CAMERA AT" command allows a "shot" to be specified. This defines the framing of the action within the display of the production. For example, "Long" can be used to refer to a very wide shot where a subject appears in the distance, or an outdoor scene is being shown. Close-Up is used to get a tight view of a subject as where a character's face fills the display. Other values for "shot" are listed in Table I and have meanings as are known in the art. Note that a numerical value can also be given along with units for the value. For example "CAMERA Camera1 50 ft" would place Camera1 50 feet from the action area, and pointing at the action area. Note that all of the parameters to the "CAMERA AT" command are optional. Where a parameter is not specified then a default is used. For example, the default "shot" parameter is a medium shot which can be 15 feet with a focal length (discussed below) of 50 mm.

The "AT" parameter is used to specify a camera's position. The position can be in terms of common names for objects within the scene. The object name can be preceded by a location word such as "CAMERA AT above Potted_Plant". This assumes there is an object in the scene that has been named "Potted_Plant." Object names are associated with objects in scenes either by default or by creation of the object and name by a modeler or scripter. As discussed, objects are created in computer modeling programs out of polygons and parts, are given "skin" textures and features, and can then be given a name to refer to the object. "CAMERA AT Potted_Plant" also makes sense to the system which would position the camera at a position occupied by at least part of the Potted_Plant object. Typically, the polygons making up the Potted_Plant object would not be rendered in the scene to avoid obstructing the view.

As with most parameters in the control script language, word descriptions for places can be substituted with math coordinates in any suitable coordinate system (e.g., cartesian, polar). Thus, a valid command is also "CAMERA AT 25,743,0".

The optional "VIEW" parameter accepts one or more objects or coordinate points as arguments. The arguments are used as the pointing direction for the camera. In the absence of the VIEW parameter and arguments, the pointing direction for the camera is the default "action area," described below. The camera "shot" is then adjusted so that all of the subjects listed as arguments can appear in the view. A valid command with a VIEW parameter is "CAMERA VIEW Character1" or "CAMERA Camera1 AT next to Character2 VIEW Character1, Character2". This would place Character 2 in the foreground of the shot which is also angled onto Character1.

Finally, "camera properties" are used to specify the focal length, aspect ratio and aperture of the camera. An example is "CAMERA WideAngleCamera PROPERTIES 110 mm" to set the focal length to a medium-length lens.

Other camera commands listed in Table I are relatively self-explanatory. They are used to control the pointing and movement of a camera to generate a view for the production. To track a character, for example, the command "CAMERA Camera1 TRACK Close-Up Character1" can be used to keep a camera close on a character's face as she wanders about a room. Note that many other types of camera commands can be designed. The parameters and specific syntax of the commands presented in Table I, or anywhere else in this specification, can be changed in many ways and still provide a useful control script command language.

Figure 3A:
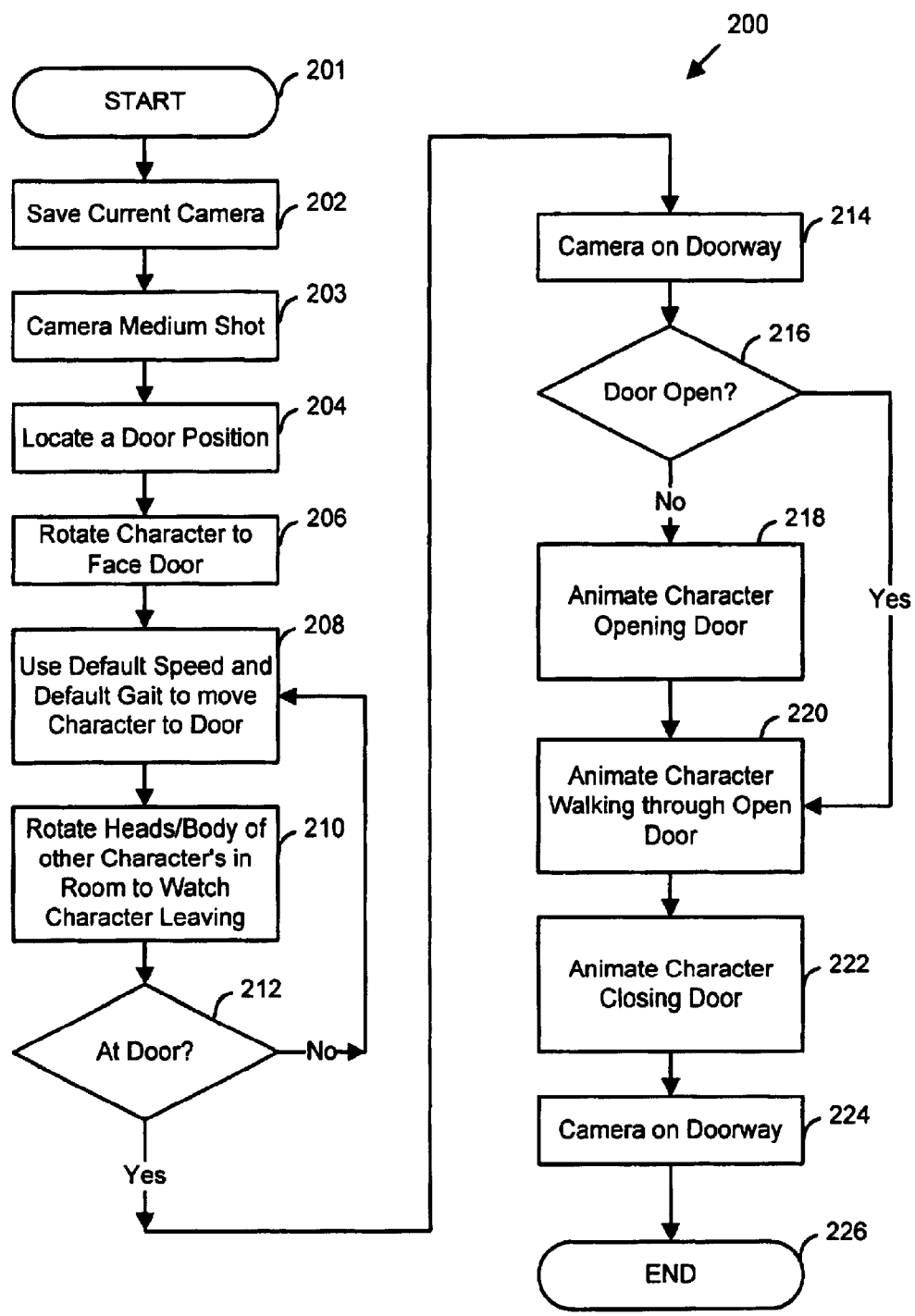
FIG. 3A illustrates a flowchart of a portion of a routine for implementing the EXITS command.
Figure 3B:
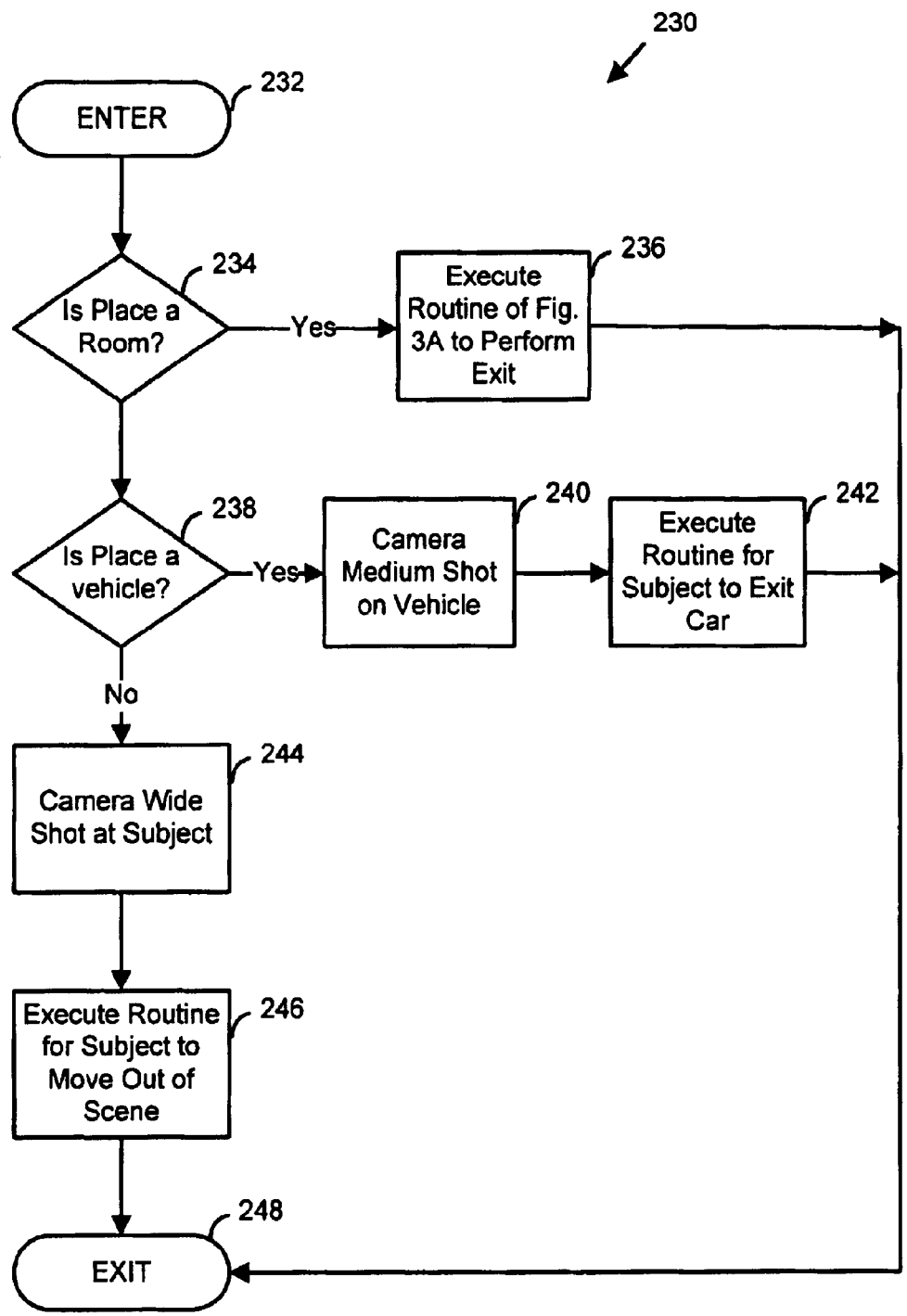
FIG. 3B illustrates the EXITS command.
Figure 3C:
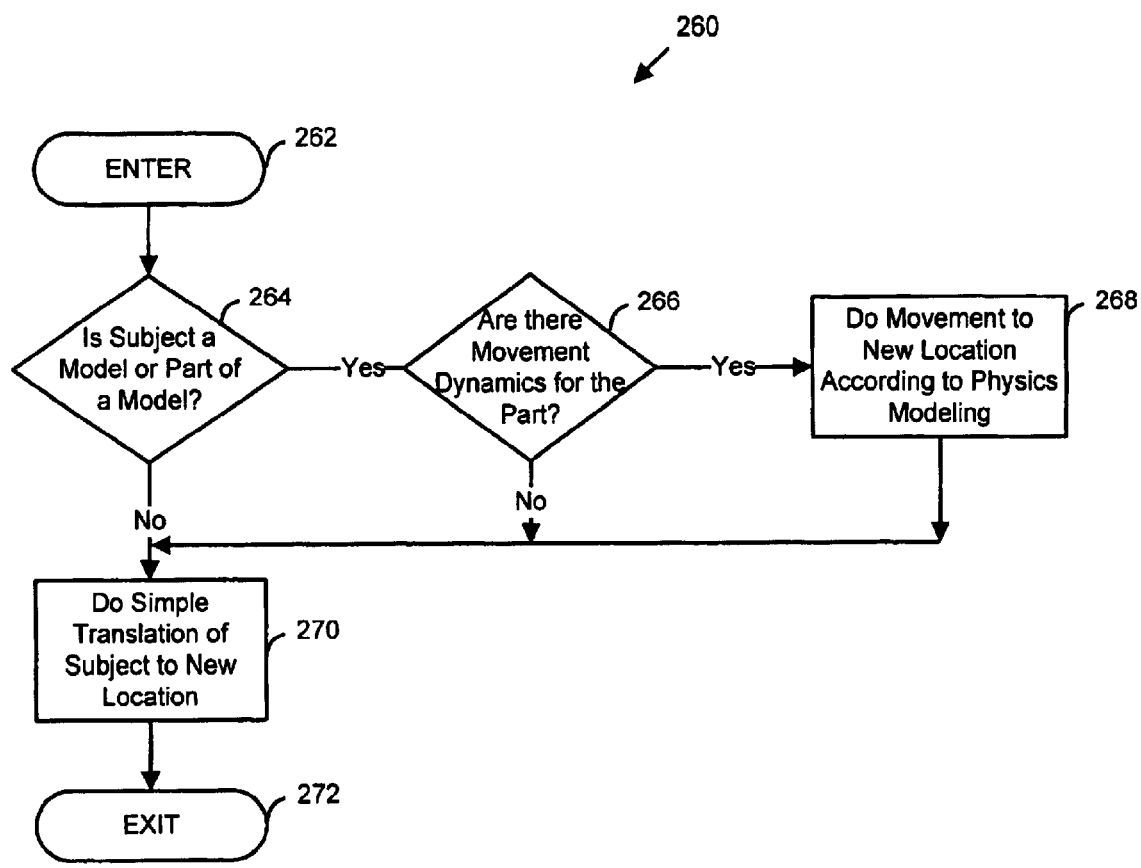
FIG. 3C illustrates a flowchart of the MOVE TO command.
Figure 3D:
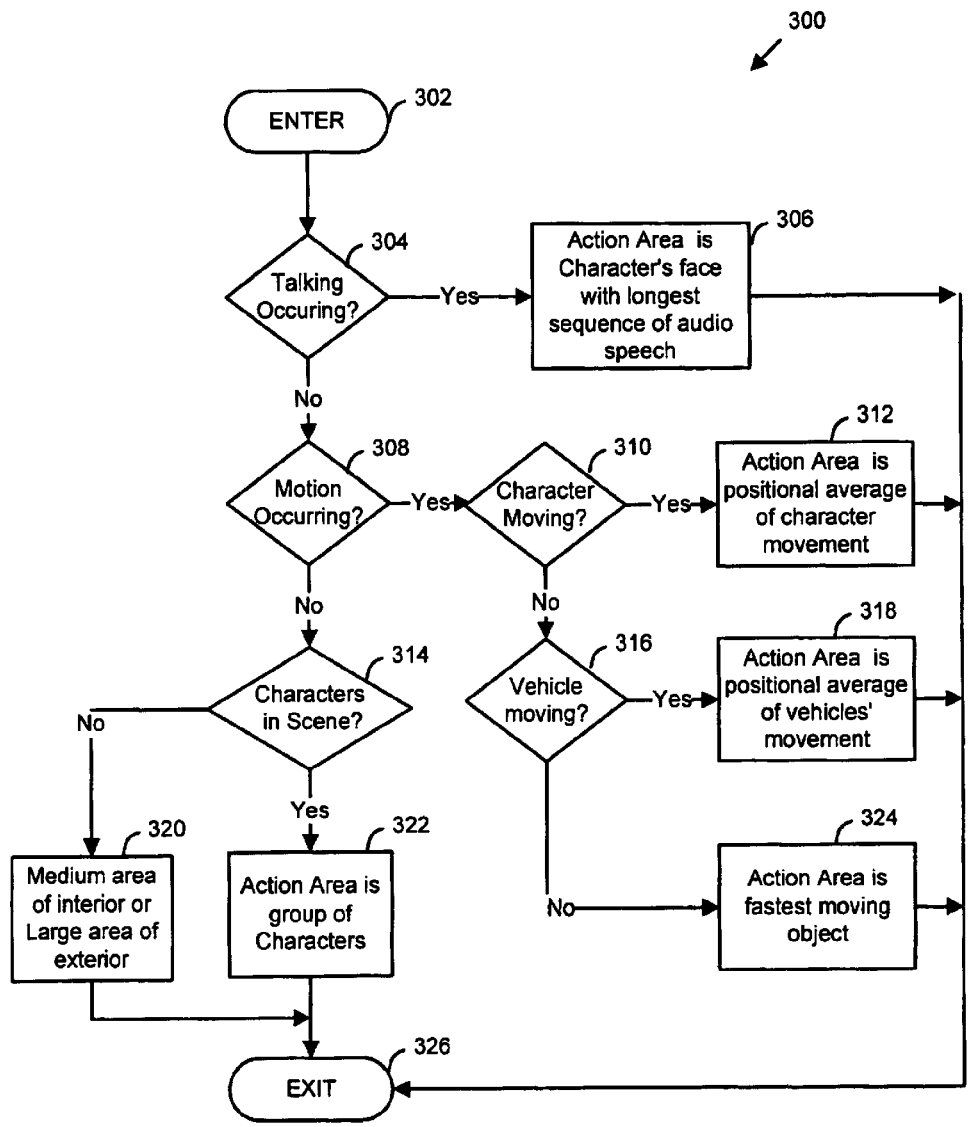
FIG. 3D illustrates a flowchart describing a routine to identify an action area.

FIG. 3D illustrates a flowchart 300 of a routine to determine the "action area." The action area is useful for automatically positioning the camera where the typical point of interest is within a scene. Note that the action area is merely a default area and will often need to be overriden with the CAMERA commands described above.

In FIG. 3D, the routine is entered at 302 when it is desirable to set the action area. At step 304 a check is made as to whether any talking is occuring. If so, the action area is set at step 306 to be a relatively small area of the character's face where the chosen character has the longest current "sequence of audio" or group of sentences.

Assuming that no talking is occurring, step 308 checks whether there is motion in the scene. If so, a check is made at step 310 to test whether the motion is from a character's movement. If so, the action area is set to be the positional average of substantially moving characters. For example, if the scene was of two people dancing in a surrounding circle of onlookers, then the action area is a small two-shot area of the couple dancing.

If motion is occurring but no characters are moving then a check is made at 316 to determine if the motion is due to a vehicle moving. If so, step 318 sets the action area as the positional average of any substantially moving vehicles. For example, in an auto chase a wide area would be defined as the action area if several widely-spaced cars are involved. If there is only one vehicle then a smaller area around the vehicle is the action area. If the moving object is neither a character or a vehicle then the action area is centered around the fastest moving object in the scene.

Returning to step 308, if no motion is occurring then a check is made at step 314 as to whether there are any characters in the scene. If so, the action area is designed to include the characters by execution of step 322. If there are no characters in the scene then the action area is set to a medium area for interior scenes or to a much larger area for exterior scenes.

II. Character Control

A major aspect of the control script is the control of characters and other movement and animation in the production. As with camera control, the level of control for characters can be fine or coarse or anywhere in-between. The present invention provides certain automated aspects of character control to make scripting easier.

Character models are similar to scene or object models in that they have "parts" or other components that can be named. A character model can have an overall name, such as "Homer." The Homer model can have a "head" part, "left arm" and "right arm," parts, and so on. As with other models, character parts can have texture maps and lighting and animation attributes. They can be assigned any number of qualities that the playback engine may use in rendering a scene. For example, a character's weight, vocal timbre, vocal accent, right or left-handedness, facial behavior, sex, dexterity, etc., can be specified assuming the playback engine is adapted to handle such attributes to render the scene.

One attribute of a character is usually a "gait" that provides a standard movement animation for the character. This can be provided as a model or a default gait can be used. The gait definition provides enough information for the playback engine to render the character doing a normal walking movement. This can be customized for a character using third-party software such as 3D Studio Max's Character Animation Studio. Many gaits and actions can be specified and associated with a character including running, jumping, standing, bowing, hitting, etc. These can be specified by using "keyframes" which are later interpolated for the full movement, by using footsteps to specify the character's movement as disclosed in patent no. or by other means as is known in the art.

Thus, a coarse level of control over a character's walk may just specify "MOVE Homer TO Room_Center." Such a command causes the Homer character to be animated to walk from its present location to the center of the room using a default gait. A next level of control would use a gait or movement animation specified by the scripter. The information for the gait can be provided from a CDROM, pre-stored on a local hard drive, sent over the control stream during or prior to playback, etc.

A very fine level of control over the character's movement is achieved by using an MPEG canned clip or other type of animation clip to superimpose into the rendered scene to show the character's motion and, optionally, audio characteristics.

In order to present details of character control, an example scene fragment of a character walking out of a room will be used. Using the example scene, four different levels of control will be presented. The first level of control is a coarse level, also referred to as Level I. The second level of control is medium level, or Level II. The third level of control is a fine level, or Level III; the final level is frame control at Level IV. As will be seen, many different levels of control are possible. Because there are many design tradeoffs and implementations of rendering scenes, performing animations, generating and using computer models, degrees of resolution for images and audio, etc., the specific control levels used in any particular implementation of the control script can deviate in number and type from those shown here.

Coarse Level of Control

The coarse level of control allows a scripter to define the scene at a very high level, or general, description that is close to everyday text descriptions such as one would find in a traditional movie or television script. For example, the entire definition of the example scene at a coarse level is "Homer EXITS Homer's_Living-Room". This assumes that the character "Homer" and "Homer's_Living_Room" have been defined. The control script word "EXITS" is part of the script language.

The coarse level of control makes extensive use of defaults. Default values, objects, locations, textures, movements, etc., exist for almost every aspect of rendering and animation. These defaults are typically part of the playback engine resident on a viewer's local computer, or are data stored in the local computer. For example, default character definitions are stored and provided with names such as DefaultCharacter_BabyBoy, DefaultCharacter_AdultFemale, etc. During script creation, the scripter views different default characters and chooses one. The scripter can assign a new name to the default character's model by, e.g., "Homer=DefaultCharacter_AdultMale". Modifications to the default are possible such as to change the default character's hair color, size, etc. These modifications are discussed below in the example of a medium level of control.

Similar to default character models, other objects, including buildings and rooms, have defaults. The system provides a library of default scenes, settings and rooms such as DefaultLib_House_Living-Room. The assignment of "Homer's_Living-Room=DefaultLib_House_Living-Room" allows the scripter to use the new name "Homer's_Living-Room" to access the default model. Again, the scripter can change the wall colors, lighting, furniture arrangement, etc. to customize the default model. Details of this are explained, below.

Thus, assuming the default models are used, the control script statement "Homer EXITS Homer's_Living-Room" now is interpretable by the rendering engine. The rendering engine is programmed to use a predefined walk, or gait, to animate the Homer character to make it walk out of the predefined room. Default audio in the form of footsteps (if the character is a human), machine clanking (for a mechanical character), etc., are used as is a default camera position and movement.

Thus, the entire instructions required of a scripter to generate a scene fragment showing a character exiting a room at a coarse level of control script is shown in Table II, below.

TABLE II

Homer = DefaultCharacter_AdultMale;
Homer's_Living-Room = DefaultLib_House_Living-Room;
.
.
.
Homer EXITS Homer's_Living-Room;

All that needs to be sent from content provider 102 (of FIG. 1A) to a user such as at user computer 106 is a definition of the instructions in Table II. Even if the pure text is sent, the entire amount of data is only about 120 words. Note that the total time of this scene fragment might be 5 seconds when rendered and animated. Assuming that 30 frames per second are generated at a resolution of 800×600 pixels per frame of 1 word per pixel then the compression ratio using a control script approach to obtain streaming video is (800×600×30)/120=120,000 to 1! This is in comparison to the 50 to 1 or so compression ratios that are considered good performance for popular codecs such as MPEG. If the control stream is even moderately compressed as, for example by using tokens or a common compression scheme, the compression level can be multiplied by a factor of 10 or more.

FIG. 3A illustrates a flowchart of a portion of a routine for implementing the EXITS command.

In FIG. 3A, the routine of flowchart 200 is entered at step 201 where it is assumed that the command interpreter has received the EXITS command along with a subject, "Homer," and a location, "Homer's_Living-Room". At step 202 the current camera position is saved. At step 203 a default camera position is set up that is a medium shot of the room including the subject to exit. At step 204 the command interpreter executes a routine to identify a door in the room model. If there are multiple doors then the nearest door is chosen. If there are no doors a default can be executed so that the character breaks through a wall, runs into the wall, etc.

At step 206 the subject is rotated to face the door. At step 208 the subject (assuming it is a character) is moved toward the door using a default walk, or "gait." Step 210 is executed to cause other characters in the room to follow the subject as the subject exits the room. At step 212 a check is made as to whether the subject is near the door. If not, the loop of steps 208, 210 and 212 repeats until the subject is at the door.

When the subject is at the doorway, step 214 is executed to change the camera angle to a tighter shot of the doorway. Note that the switching of camera angles is optional and can be overridden by using a toggle to the command. For example, the EXITS command can be specified with a CAMERA keyword so that the Current camera settings can be used (e.g., Homer EXITS Homer's_Living-Room CAMERA Current). This would prevent steps 202, 203, 214 and 224 to be executed. Other toggles are used to allow different camera tracking for the EXITS sequence. For example, the use of "CAMERA Follow" causes the camera to follow the subject out of the room. Other combinations of camera changes for the exit animation can be pre-defined, saved and invoked in much the same way that names are assigned to models for later reference of the models. Step 216 is executed to determine whether the door is open. If so, execution proceeds to step 220 where the subject is animated to walk through the door. Otherwise, if the door is closed, the subject is shown opening the door at step 218 and then step 220 is executed.

Step 222 is next executed to show the door being closed. Finally, step 224 is performed to restore the saved camera position assuming the default automatic camera changes were being used for the EXITS command. The routine exits at 226.

Medium Level of Control

The medium level of control deals with changing the default parameters of default items and actions.

To continue with the example, above, with respect to the coarse level of control, a default character such as DefaultCharacter_AdultMale includes many default parameters as shown in Table III, below.

TABLE III

DefaultCharacter_AdultMale (Height = 6'1", Weight = 185 lbs, FacialFeatures(Color = dark, Style = handsome), SkeletalModel = average, Musculature = normal, GaitType = average, MovementType = average, Voice = Default_AdultMale, Associations( Clothes = *outfit48, Holding_LeftHand = briefcase))

The parameters and values are mostly self-explanatory so that scripters do not need much training to begin operating at a medium level of control. For example, changing the height or weight values will have predictable effects on the default character model. The parameters are referred to as "attributes" of the model which they affect (in this case, the character model) and the parameter and its associated value is referred to as an "attribute/value" pair.

For example, setting the height value to a larger or smaller value results in a deformation of the character model to, respectively, stretch or shrink the character. Setting a value can be without reiterating all of the parameters. For example, the script statement "DefaultCharacter_AdultMale(Height=6'5")" sets the height of the character to 6 feet 5 inches without affecting the other attributes. Some attributes, such as "FacialFeatures" include sub-attributes such as "Color" and "Style" as indicated by parentheses surrounding the sub-attributes immediately adjacent to their associated parameter, "FacialFeatures". Values such as "dark," "handsome," and "average" are text equates with default values, or numbers, that are actually used by the rendering engine to perform computations. The word "dark" causes the rendering engine to use darker skin tones, hair and eye colorations, etc. The use of these intuitive text equates makes the script language easier to use.

Finally, other values such as "*outfit48" which are preceded with an asterisk are pointers to other complex models or groups of parameters. The outfit48 model is more fully defined as outfit48(head=null, torso=suit9, legs=suit9, arms=suit9, shoes=oxford2). Thus, outfit48 defines part models to be used to model, render and animate the character. These part models, when used by the rendering engine, are ultimately defined as math polygon models that can have properties such as associated texture maps, reflectivity, stiffness, etc., so that the rendering engine can calculate the look and behavior of the part models by using mathematics to model real-world physics. Any degree of complexity can be employed as is popular among rendering engines in the art.

Note that the preferred embodiment generates customized, "derived," data from default data (e.g, model deformations) locally on the user's computer whenever possible. When a default model is to be deformed (e.g., by assigning a new value to the "Height" attribute) the model is preferably deformed by computations on the user's computer before the derived model is needed in the playback of the production. The new model can be computed and stored in the user computer's RAM, hard disk storage, or other local storage. An alternative is to compute the model deformation (or other deviation from the default data) at another computer, or processing device, in the delivery chain. A likely candidate would be the content provider's computer. The derived data can be delivered to the users' computers by, e.g., streaming the new data over the Internet, to multiple user computers. This is not as desirable as performing the derivation computations at the user's computer since a very large amount of data may have to be delivered when there are many deviations from default data such as where a production needs new models for characters, objects, associated texture maps, lighting characteristics data, physical modeling and behavior, etc. Naturally, approaches to reducing the amount of data to be multicasted can be employed such as caching the data at network servers, etc.

Table IV shows the parameters associated with DefaultLib_House_Living-Room.

TABLE IV

DefaultLib_House_Living-Room(ObjectType = room, Size = medium, Walls(Front = walnut_panelled, Left_Side = walnut_panelled, Right_Side = walnut_panelled, Back = walnut_shelves), Light(type = incandescent, fixture = orb, color = white, intensity = 300 watts, Location = RoomLocation[DefaultLib_House_Living-Room, ceiling_center], Contains(Sofa(Size = 4_person, Weight = 250 lbs, Type = leather, Style = classic1, Location = FurnitureAt[DefaultLib_House_Living-Room, room_front])

The syntax shown in Table IV is the same as for Table III. Square brackets are used to indicate a function's parameters. For example, the function RoomLocation is used to return a value based on a given room "DefaultLib_House_Living-Room" and a desired location, "ceiling center". The use of text equates for values, data structures, etc., also makes the understanding, and modification, of the room model more intuitive for scripters.

Parameters for the control command "EXITS" include the speed of exit written as, e.g., "EXITS(Speed=slow)". The word "slow" has been equated with 5 feet/sec to approximate a slow walk. Other equates are "medium," "fast," "run," "crazed dash," etc. Additional attributes include the "Style" attribute which modifies the "gait" or locomotion animation sequence of the character. So the EXITS command can be further specified at a greater level of control by using its attributes such as "Homer EXITS(Speed=slow, Style=crawl) Homer's_Living-Room". The EXITS command is adapted to handle more than just exits from a room. The command detects what the current environment is (e.g., a room, vehicle, open area) and can perform different animations and camera placement accordingly to achieve a scene that makes sense and is intuitive given the command.

An example of medium-level control provides a scene where Homer is wearing a clown suit and exits the room just after a fuse has blown as follows:

Homer(Associations(Clothes=*clownsuit));
Homer's_Living-Room(Light(intensity=15 watts)); /* not 0 watts or nothing visible!!
Homer EXITS Homer's_Living-Room;
Note the comment enclosed by "/*" and "*/". The use of different clothes introduces a new aspect of the invention. Namely, overriding a default value with a new, undefined value. Assuming that the clownsuit is not in the default library resident in the rendering engine or in data storage local to a viewing user's computer, the clownsuit model must be sent to the user's computer. This transfer can be performed over the Internet as part of the streaming control stream. The data transferred will include polygon models of the look of the attire, texture maps for the pattern and color of the clownsuit, and possibly other information such as the type of cloth, etc., if the rendering engine has the ability to do particle systems or other advanced simulation and modeling. Note that the clownsuit data can be streamed to the user's computer at any time before it is needed. A good time to do such streaming is when the other bandwidth requirements of the production being streamed are low. For example, where a scene is being rendered with a high amount of defaults (as in the example above in the section on coarse control) then additional data can be sent. It is also possible to send the data before the actual production begins as part of a preliminary delivery of information. Such a transfer can take place hours or even days before the production is to be multicast. Still other methods of delivering customized data can use storage media such as CDROMS or DVDs. Data can also come over other communication channels connected to the user's computer such as telephone, DSL, cable modem, satellite or fiber optic signals, etc.

Every type of data that is used in the rendering engine can be changed from production to production, or even within a production by using the data streaming approach. For example, the models and texture maps to define characters, parts of characters, furniture, rooms, animations and sound can all be changed to define a different production for playback. The delivery of the data to a user's computer can be by any of the methods described above, or by other methods.

The medium level of control further makes use of "macro" expansion when a scripter is writing a script. To understand this concept, more details of the EXITS command are next presented.

FIG. 3B illustrates the EXITS command.

In FIG. 3B, the command interpreter begins execution of the interpretation of the command at step 232 where it is assumed that a subject and a place have been specified. At step 234 a check is made as to whether the place is a room. If so, execution proceeds to step 236 where the steps of FIG. 3A, flowchart 200, are executed and the routine terminates at step 248.

If the place is not a room, then execution proceeds to step 238 where a check is made as to whether the place is a vehicle. If so, execution proceeds to step 240 where a camera is set up to be a medium shot on the vehicle's exterior. Again, this default camera position can be overridden with the "CAMERA Current" command. At step 242 the subject is shown exiting the vehicle and the routine terminates at step 248.

If the place is not a room or vehicle then execution proceeds to step 244 where the camera is set up as a wide shot. Next, step 246 is executed to show the subject moving out of the scene, or off of the frame, while the camera remains stationary. This assumes that the setting is an exterior where such an animation can take place. Naturally, any manner of additional variations on the EXITS routine can be added. Thus, the EXITS command is easily expandable to accommodate different "places." The basic concepts of providing different camera shots and animations to perform the exit, and the hierarchy of levels of control, as desired by the scripter, make such an approach a very powerful tool in allowing quick authoring of high-quality productions.

As an aid to the scripter, when control script text is being written the scripter uses a special scripter interface. This allows the scripter to specify that a command, such as EXITS, be expanded into statements corresponding to the flowchart of FIG. 3B. Further expansion is possible so that the scripter can insert the commands of FIG. 3A in place of step 236 of FIG. 3B. The scripter is thus presented with all of the substeps that go into the default handling of the EXITS command and can further modify the exit animation. For example, the camera positions and movements can be easily modified by merely changing the text of those commands without having to type in complete new commands. This approach of macro expansion to the control script authoring of the present invention is another powerful tool.

Fine Level of Control

A fine level of control often requires the scripter to use math definitions. This usually makes the fine level of control more time-consuming and complicated to use. However, the fine level of control allows the scripter much more ability to change the scene in highly specific ways and is the ultimate level of modeling and animation control over the scene.

An example of a fine level of control uses the MOVE TO command. This command takes a "subject" after the MOVE keyword and a coordinate location following the TO keyword. In the statement "MOVE Homer TO 25,80,0" the subject is the "Homer" Character1 and the coordinate location to move to is given in x,y,z Cartesian coordinates. A syntax definition of the MOVE TO command is shown in Table V, below.

TABLE V

| Syntax | Description |
|---|---|
| MOVE(attribute/value pairs) {"subject_name"} {TO/TOWARD position}; Where attribute/value pairs includes "Speed," "Style," etc. as defined for the subject type. position can be an object name preceded by "above," "below," "next to," "inside". Default is the action area. Can use x,y,z for coordinate position. | Basic movement command. Use TO to move character to position and stop. Use TOWARD to keep moving in a position direction. Note that "subject_name" can be a model, part, polygon, point or other item. If the item has physics associated with it then the physical rules are used to perform the motion. |

A flowchart of the MOVE TO command is shown in FIG. 3C.

In FIG. 3C, flowchart 260 is used to illustrate the basic operation of the MOVE TO command. The routine is entered at step 262 where it is assumed that a subject to be moved ("subject_name"), and a position to move to (position), have been specified. At step 264 a check is made as to whether the subject is a model, such as a character, object, etc., or a part of a model, such as a leg or foot part. If not, a simple translation of the subject to the new position is performed at step 270 and the routine completes at step 272.

If the subject is a part or a model then execution branches from step 264 to step 266 where a check is made as to whether movement dynamics, or other physical modeling rules, are associated with the part or model. If not, execution proceeds to step 270, as before. If the subject has movement dynamics execution proceeds to step 268 where the subject is moved according to the physical modeling. An example of such modeling is where the subject is a foot of a character model. In order to move the foot to a new position, inverse kinematics computations are performed to also move the associated leg part, hip part and torso of the character.

Another example is where the subject is a lit candle that is falling to the floor. The falling movement can be simulated with a tumbling and twisting of the candle while the candle flame is blown backwards, away from the direction of the fall. Any manner of physical modeling can be employed.

After step 268 completes, the routine is exited at step 272.

Thus, even with a fine level of control, the invention provides defaults and rules for allowing a convenient specification of the scene to be rendered in the production. As with the macro expansion, the physical modeling can result in additional rules, or steps, being presented to the scripter (e.g., to describe the skeletal parts of the character as it walks in terms of body part positions in space) which can be further modified, as desired.

Frame Level of Control

Yet another level of control beyond the fine level of control provides absolute control over the production presentation. The "frame" level of control allows a scripter to specify that pre-recorded frames of image and audio information can be displayed in place of any real-time rendered frames generated by the rendering engine on a user's computer.

For example, to continue with the present example, 5 seconds of recorded animation of the character exiting the room can be displayed in place of displaying real-time computed and rendered frames. This allows the production to have any manner of effects such as having Homer take the final steps on his hands while pink flamingos fall out of his pockets and the roof blows off. Since the frames are pre-rendered the level of detail, movement and all aspects of the image and sound presentation are fully under the control of the scripter, or other production personnel. The drawback is that the information is much larger than that required to merely control a rendering engine that makes substantial use of default information as discussed above. However, allowing the combination of both to a degree that is highly specified provides great benefits to the production.

This is especially true where close up of details becomes important. One shortcoming of computer-generated images is that certain imagery is extremely difficult to compute. For example, the lifelike movement of facial features is difficult to render in a believable manner. Also, movement of water, fire, smoke, etc., is highly compute-intensive as it requires computing many points in a particle system. Where this imagery becomes noticed in a scene, or becomes the focal point in a scene, it is valuable to be able to substitute pre-rendered frames, live video, or other imagery, in a flexible manner.

The present invention achieves this with the PLAYFRAMES command. The PLAYFRAMES command syntax is shown below in Table VI.

TABLE VI

| Syntax | Description |
| --- | --- |
| PLAYFRAMES *frames {AT position} {TEXTUREMAP = polygons} <u>Where</u> *frames is a pointer to the sequence of frames to be played. position can be an object name preceded by "above," "below," "next to," "inside". Default is the action area. Can use x,y,z for coordinate position. polygons is used where the sequence is to be used as a texture map | Plays back a sequence of frames to perform an animation. Can specify a position for playback or can specify one or more polygons to receive the sequence as a texture map. |

TABLE VI-continued

| Syntax | Description |
| --- | --- |
| over polygons. A part, model or other object can be used. | |

As shown in Table VI, the PLAYFRAMES command lets a scripter specify a position (e.g., PLAYFRAMES *CandleFlame AT above Candle_object) or a set of polygons (e.g., PLAYFRAMES *Tv_Program TEXTUREMAP Television_Set(Part=Front);). A preferred embodiment supports different formats of digital video such as AVI, MPEG, MOV. Any format can be supported. The playback of the frames can be controlled by additional parameters in the sequence itself, or associated with the command word such as the frame rate, size of the frames, etc.

Prerecorded frames can occupy the entire display of the production (the default) or just a fraction of the display. For example, prerecorded frame in the present example can be of the entire living room as Homer exits. Or a short sequence of frames can be used to just animate Homer's lips as he says, "Ok, I'm leaving." Multiple smaller prerecorded frame windows can be used within the display so that other frame sequences are being played back at the same time. Where prerecorded frames occupy less than the full display, a position must be associated with one or more of the frames to let the command interpreter direct the rendering engine to position the frames.

Figure 4:
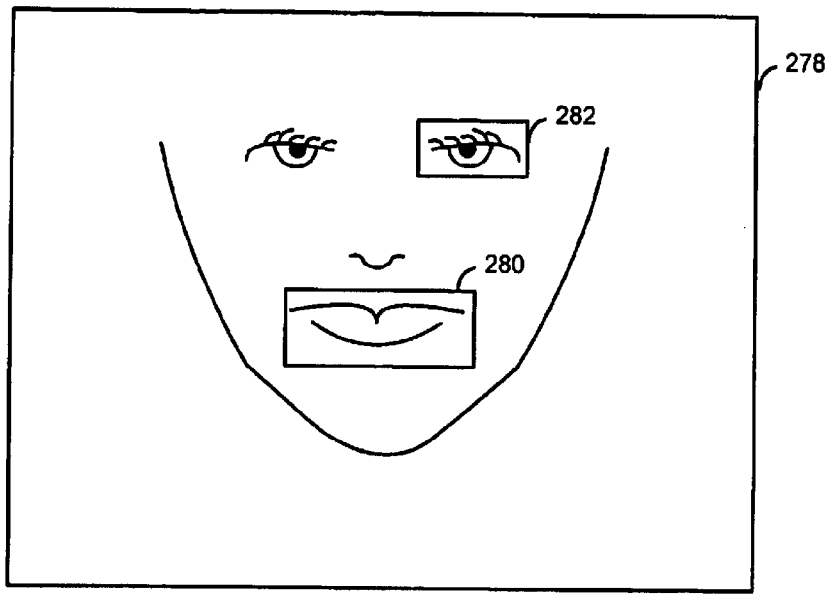
FIG. 4 shows an example of multiple small frame sequences used concurrently in a scene of a production.

FIG. 4 shows an example of multiple small frame sequences used concurrently in a scene of a production.

In FIG. 4, area 280 is a first sequence of frames to animate the lips of face 278. Area 282 is a second sequence of frames to animate the left eye of the face.

Delivery of the prerecorded frames can be by any means discussed above. That is, the frames can be streamed before, or at, the time they are to be displayed. The frames can be delivered on a stored media such as a CDROM, DVD, magnetic disk, random-access memory, etc. Other communication channels can be used to transfer the frames. The frames can be computer-generated or can be derived from live video, or a combination of both.

III. Audio

The system of the present invention allows different levels of audio control and fidelity to be handled in a fashion that is analogous to the coarse-fine levels of scripting control. Default audio handling mechanisms are employed for speech, music and sound effects. These features allow productions to be scripted quickly by using defaults and intuitive commands, or to exert more control over the production by using finer levels of control and customized data and parameters.

Speech

A challenging aspect of producing appealing productions with a computer rendering engine is the handling of audio and imagery with speech. Today's rendering engines generally fail to provide sufficient facial details such as facial expressions and lip movements synchronized to sound tracks. Typically, the audio can be synchronized to the image information by implementing a time code such as SMPTE, or by a rudimentary synchronization of the audio track to keyframes in the image information.

The approach of synchronizing audio tracks to facial and lip movements is expensive in terms of computing power both in creating the proper movements at the modeling and animation stage and in re-creating the movements when the production is played back. For example, a typical approach would have a computer modeler create top and bottom lip pair parts and compute the forming of the vowel sound "o" so that the lips animate to form a circle. Then this animation would have to be synchronized to the exact point in a sentence in an audio track where the character is making the "o" sound. This approach would have to be taken for each sound in the lines that the character is speaking.

Although the system of the present invention allows for such an approach (by using a synchronization method similar to those presented, above) the system also allows for less accurate, but also less costly and complex, synchronization of movements to audio speech.

One approach is to include pre-computed lip movements associated with a few key phonetic sounds. For example, the "o" sound is a default lip animation. This sound is triggered when an audio track is supplied for playback in association with a character. First a determination is made by the rendering engine whether the character's lips are visible in the frames being rendered. This takes into account both the field of view of the camera, the position of the character's head and the size of the character's lips in the frame. If the lips are sufficiently visible then a speech analysis process in the rendering engine on the user's computer continuously interprets the speech track currently being played back to trigger the lip movements in accordance with the audio track. Note that the speech analysis can be a complex speech-recognition-type of algorithm, or can be a simplified approach where only volume and wave envelope characteristics are used to trigger the pre-determined lip animations.

Figure 5:
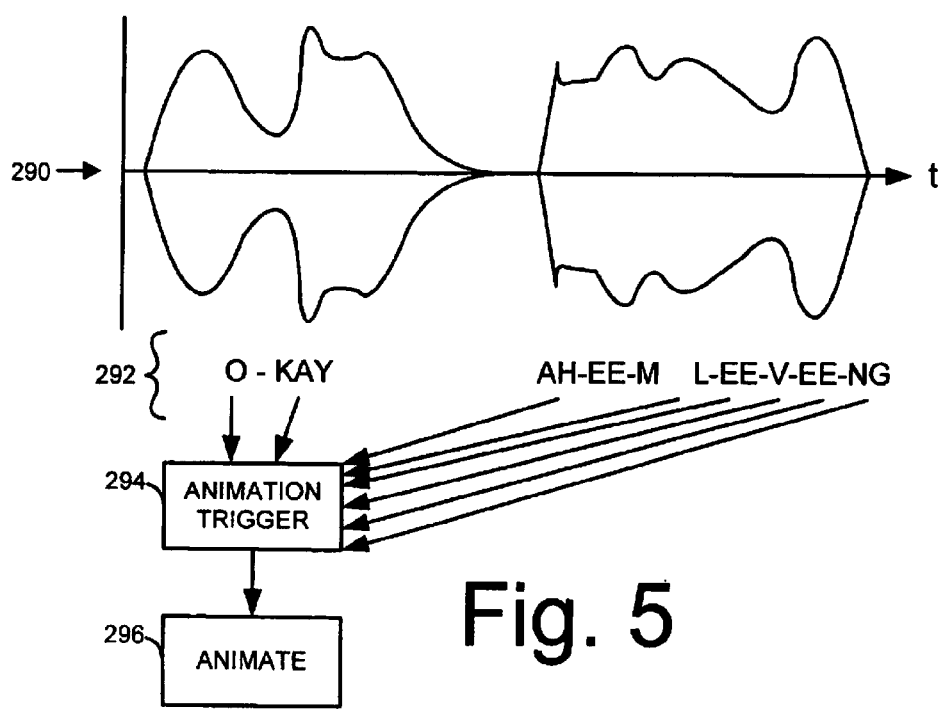
FIG. 5 shows sound analysis and the control of animation in response to the analysis.

The lip animations themselves can have varying degrees of complexity and modeling. A high degree of modeling would use texture mapped polygon-rendered parts for the lips and translational and deformational manipulations to cause the movement. A simpler approach could use multiple frames of two-dimensional bit-mapped texture maps that are played back in a short burst and mapped onto the "mouth" of the character. This is shown in FIG. 5 where sound waveform data 290 is analyzed by animation trigger 294 so that different basic sounds shown at 292 are used to trigger different animations that are played by animate process 296.

Yet another simplification in the presentation of synchronized speech is to send embedded text for the speech. For example, the phonetic text shown at 292 can be sent instead of the digital waveform at a great reduction in overall transferred data. Or, plain text can be sent, instead. Such embedded text is used by a speech synthesizer at the user's computer executing the rendering engine and can be part of the command interpreter. Modern speech synthesizers allow some modification to the sound of the "voice" by, e.g., allowing specification of the tone, pitch, accent, emotional intensity, etc. The text is more easily analyzed than a digital audio waveform for extracting phonetic information to effect the lip movements as described above. Alternatively, the phonetic information can come directly from the speech synthesizer which must perform such analysis, anyway, in order to produce audible speech.

Music

Music can be handled as digital audio in the same way that speech digital audio can be sent over the control stream. Stored locally to the user's computer and triggered by tags or tokens in the control stream, or by other methods.

A simplified version of music handling uses MIDI format. This greatly reduces the amount of information necessary to specify the music. However, a MIDI playback device must be available at the user's computer to cause the playback of the MIDI-defined notes.

Alternatively, the user's computer (e.g., as part of the rendering engine) can be equipped with pre-stored generic wave or MIDI format music. Music can also be generated with software so that, for example, MIDI music is generated on-the-fly at a specified tempo, style, volume, etc. Such pre-stored, or generated, music can also be the default. Such defaults can be controlled by script command tags such as those shown in Table V, below, which, respectively turn the default music on (whether it be wave or MIDI format); turn the default music off; allow a scripter to specify some attributes of the default music if an appropriate music generator is present; allow a custom wave file to be played; and allow a custom MIDI file to be played.

TABLE VII

DefaultMusic_ON
DefaultMusic_OFF
DefaultMusic(Volume = normal, Style = spooky, Tempo = 80 bpm);
PlayWaveMusic(*musicwavefile);
PlayMidiMusic(*musicmidifile);

IV. Synchronization

One aspect of the control stream of the present invention provides for synchronization of the various commands and their corresponding image actions and sound effects. Naturally, it is important that timing considerations be accounted for so that where the control script calls for an action that should take 2 seconds (e.g., speaking a short sentence) the action actually does take about 2 seconds when the production is played back on a user's computer.

The problem of synchronization is non-trivial because of the many variables encountered in the playback of a production on a computer. Especially where the production is being transferred over a communication link, such as the Internet, that has many unpredictable variables and delays.

For example, the data streaming rate in today's Internet using transfer control protocol/Internet protocol (TCP/IP), or other protocols and mechanisms, is never guaranteed. This is because there may be many computers, or servers, that the information travels through before reaching a user's destination computer. Each server may delay the transfer of information for an indeterminate amount of time depending on how many other computers or users are attempting to obtain information from or through the particular server, the amount of processing, memory, storage and communications resources at the particular computer, the usage of each of the resources by one or more tasks or processes operating in the server computer, etc.

Not only is the rate of transfer of the control stream information to a user's computer in doubt, but once the control stream information is received by a user's computer it is likely that the ability of the user's computer to play back the production at a constant, intended rate will change frequently. The playback ability of a user's computer depends, also, on what other tasks or processes the user's computer is performing, the amount of resources at the user's computer, the efficiency of hardware devices (e.g., disk drive, CD-ROM drive, etc.), the user's input and control of the computer, etc.

The task of the synchronization feature of the present invention is to maintain a roughly constant playback at the intended rate for all of the image and audio actions taking place on each playback machine. In the preferred embodiment this is done by indicating a start time and duration time for selected commands in the control stream.

For example, the text below starts a camera pan. At the end of the camera pan an MPEG canned clip starts to play.

| | |
|---|---|
| 00:01:30 | CAMERA PAN FROM Doorway TO Room_Center |
| 00:01:34 | </CAMERA PAN> |
| 00:01:34 | CANNED FROM CDROM MPEG = Lump_starts_rising_below_carpet" |
| 00:01:39 | </CANNED MPEG> |

A default pan time is assumed. This is computed based on the scale of the model and a medium speed pan that is pleasing to viewers. The computation is done at the time of writing the script and is displayed for the scripter as an aid so that the scripter has an idea of the pacing of events. The time starts and ends of actions are compiled into the control stream as the number of "tics" (e.g., a tic can be 1 second) from the beginning of the production. Thus, for certain actions, each playback engine is given an action, the action's start time, and the action's finish time. The playback engine then interpolates the action to fit into the provided times. Where a playback engine executes on a computer that is slow, that engine takes steps to compensate such as by dropping frames, reducing the resolution or size of the playback, decreasing the fidelity of the audio playback, etc. Likewise, on a fast computer the playback engine may compensate by generating more frames, higher resolution frames, or both. The playback engine may also perform extra processing in the "spare" processor cycles it has, such as by pre-rendering scenes, computing lighting effects, decompressing or decoding images, audio, etc.

Typically an action is given a "slip" factor that allows that action to deviate from the exact number of tics in duration, stop or start times. For example, the slip factor for pans is set to 15% in the preferred embodiment. This means that for a 4 second pan the acceptable range is from 3.6 to 4.4 seconds.

After the pan completes, the playback engine is instructed to begin playing a streaming MPEG canned clip. The decoding and playback of the clip is similar to the synchronizing for the pan. The playback engines attempt to make the duration of the MPEG clip at about 5 seconds. Again, there is an acceptable slip factor. If there is audio associated with the clip then the allowed slip factor is less since changes in timing of audio are often more noticeable.

To illustrate, assume a control stream is being sent to three computers, A, B and C. The control stream includes action synchronization as in the above example. Each of the computers includes a timer that is used by the respective playback engine on the computer. For example, the system clock in a typical PC can be used. Or each playback engine can maintain its own clock, or timer, by using an interrupt-driven counter, hardware timer, software timer, or by other means. Computer A provides the slowest platform. Computer B is an optimum speed platform. Computer C is the fastest platform.

As the control stream is received by each computer, the next command, i.e., the camera pan command, is started. When a playback engine starts the pan command the engine also takes note of its local timer's time. The pan movement is performed in accordance with the target duration of 4 seconds. Since Camera A is slow, it may drop frames, reduce resolution, etc., as necessary to keep up with the target duration. Computer B is able to play back the pan action optimally while Computer C has extra resources to perform additional functions, such as more detailed rendering, while the pan action is being effected.

Although synchronization is only shown above for a pan and clip playback, it can be applied to any action whose control is implemented by the control script.

In the preferred embodiment, there is no attempt to synchronize playback among machines. That is, two different user computers may be playing back the same production originating from the same content provider. These two user computers may show different images on their screens at different times. However, it is generally not necessary to try to make the playback of end user computers occur at the same time. Rather, the goal is to have a consistent pacing of the actions at the computers so that the production appears to play smoothly on any given end user computer in isolation from other end user computers. A scheme that maintains more accurate synchronization among end user computers may be achieved by having the playback clock come from a source that is common to multiple end user computers (such as a server computer, satellite broadcast or radio frequency time signal, etc.).

CONCLUSION

Although data is primarily described as being delivered via a control stream which implies real-time linear delivery over a network, the data can be delivered by other means such as by a diskette, CDROM, RAM cartridge or device or other recorded media device; by any communication channel such as a telephone line, cable, satellite transmission, fiber optic. Different portions of data can be delivered by different means. Some portions can already be resident on a playback processor and, thus, do not need to be obtained for playback of a particular production, for example, by streaming the portions at the time of playback.

Although the invention has been describe with respect to computers, and routines, processes, steps, etc., executed by computers, the use of the term computer is intended to include any digital processing device such as a consumer electronic device, web browser or other digital processing hardware or software suitable for carrying out aspects of the present invention, or for performing functions of the present invention.

Any suitable programming language can be used to implement the routines of the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing. Note that steps can be added to, taken from or modified from the steps in the flowcharts presented in this specification without deviating from the scope of the invention. In general, the flowcharts are only used to indicate one possible sequence of basic operations to achieve a functional aspect of the present invention.

Although specific routines may be discussed with respect to executing on a specific component of the system (e.g., by the command interpreter on a user's computer) other implementations can have the routine, or parts of the routine, execute on different processors. For example, this specification has included a discussion of the command interpreter determining if there is a door in a room in a model. In another embodiment, the rendering engine can determine if there is a door in the room based upon a definition of the room or other information such as defined paths through a structure, tags or identifiers on parts that make up a model, etc. In general, the implementation of routines discussed in this specification can be achieved in many different ways using appropriate programming techniques as is known in the art. Other computers, or processing devices, can perform one or more of the steps of the routines. The steps can be performed in real time, immediately prior to displaying the scene, or at some time before the scene is rendered. For this reason, the specification generally deals with the functionality of routines and not the implementation of the functions.

The present invention has application beyond entertainment, educational or informative productions. The aspects presented here for a control language to control rendering engines at a content delivery destination can be applied in any case where image and audio information need to be transferred over a bandwidth-limited channel. For example, the control information need not follow any of the format presented herein and need not originate from a prepared script by a human scripter. Control information can be generated automatically to create a control camera that is a digital camera that translates actual real-world scenes into a control format and then sends or stores the control information for playback at another location or at another time. Such an approach can use two-dimensional image recognition processes to generate a model for, e.g., surveillance cameras, web cameras, etc. This also allows motion capture techniques to be used to directly generate control language animations as opposed to a human designer operating a computer assisted modeling and animation program.

The present invention is also adaptable to be used with interactive productions. Since there is a rendering engine operating at the user's computer, the user may be allowed to take control of one or more aspects of the production at any time. For example, the user can be asked to direct a character's actions, change the camera view, or provide other discrete or continuous input to achieve an interactive game or other production. The transition from user interaction and control can be made seamless. In response to the user's actions, different control script can be sent from a process running on the content provider server, the user computer, or another source.

The present invention enables various revenue schemes. Downloads in the form of control script files can be made available from many different sources as long as they are written in a compatible format. The files can be streamed or downloaded in their entirety and run on a user's computer. A manufacturer of the command interpreter, or other component of the system, can detect when a production is played back and charge the user accordingly. Identifiers can be associated with the control script files so that authors of the files can be paid (e.g., if the production is something a user wants to view) or can be charged (e.g., if the production is, or includes, an advertisement). The number and amount of viewing a production can be tracked and the information provided to a controlling entity so that royalties or other fees can be charged, so that the demographics and other statistics of the viewing user's can be compiled and used to advantage, or for other purposes.

Although the invention has been described with respect to particular embodiments thereof, these embodiments are merely illustrative, not restrictive, of the invention, the scope of which is to be determined solely by the appended claims.

What is claimed is:

1. A method for providing a visual production on a computer system, wherein the computer system includes a processor executing a rendering engine to produce images on a display, wherein the computer is coupled to a network, wherein a data source is also coupled to the network so that a stored plurality of predefined control commands derived from a script created by a human author can be transferred from the data source to the computer system via the network the method comprising the steps of receiving the control commands from the data source at the computer system;

rendering a character on the display in response to a first control command;

rendering an object on the display in response to a second control command;

animating the character to perform an action with the object in response to a third control command; and changing the view of a scene being rendered in the computer system in response to a fourth control command.

2. The method of claim 1, further comprising the steps of associating a name with an object in the scene; and using the name to define a camera position to render the scene.

3. The method of claim 1, further comprising using a default area in a scene to determine a camera pointing direction.

4. The method of claim 3, wherein the step of using a default camera area includes a substep of determining an action area where action in the scene is occurring; defining the default area to include at least a portion of the action area.

5. The method of claim 4, wherein the action area includes object movement.

6. The method of claim 5, wherein the action area includes character speaking movements.

7. The method of claim 1, further comprising setting the camera position at substantially the object's position in response to a camera position control command.

8. The method of claim 7, further comprising omitting rendering of the object.

9. The method of claim 2, further comprising setting the camera position adjacent to the object's position.

10. The method of claim 2, wherein the object position is changing, the method further comprising setting the camera position at a point that is derived from the object's changing position.

11. The method of claim 2, wherein the object includes parts having positions, the method further comprising setting the camera position relative to one or more of the part positions.

12. A machine-readable medium including instructions for providing a visual production on a computer system, wherein the computer system includes a processor executing a rendering engine to produce images on a display, wherein the computer is coupled to a network, wherein a data source is also coupled to the network so that a stored plurality of predefined control commands derived from a script created by a human author can be transferred from the data source to the computer system via the network, the machine-readable medium including instructions for performing the following:

receiving the control commands from the data source at the computer system;

rendering a character on the display in response to a first control command;

rendering an object on the display in response to a second control command;

animating the character to perform an action with the object in response to a third control command; and changing the view of a scene being rendered in the computer system in response to a fourth control command.

13. An apparatus for providing a visual production on a computer system, wherein the computer system includes a processor executing a rendering engine to produce images on a display, wherein the computer is coupled to a network, wherein a data source is also coupled to the network so that a stored plurality of predefined control commands derived from a script created by a human author can be transferred from the data source to the computer system via the network, the apparatus comprising:

a processor for executing instructions;

a machine-readable medium including instructions for receiving the control commands from the data source at the computer system;

rendering a character on the display in response to a first control command;

rendering an object on the display in response to a second control command;

animating the character to perform an action with the object in response to a third control command; and changing the view of a scene being rendered in the computer system in response to a fourth control command.

14. A computer data signal embodied in a carrier wave including instructions for providing a visual production on a computer system, wherein the computer system includes a processor executing a rendering engine to produce images on a display, wherein the computer is coupled to a network, wherein a data source is also coupled to the network so that a stored plurality of predefined control commands derived from a script created by a human author can be transferred from the data source to the computer system via the network, the computer data signal including instructions for performing the following:

receiving the control commands from the data source at the computer system;

rendering a character on the display in response to a first control command;

rendering an object on the display in response to a second control command;

animating the character to perform an action with the object in response to a third control command; and changing the view of a scene being rendered in the computer system in response to a fourth control command.

* * * * *